Nov. 14, 1961

C. PAVIA 3,008,505

COMMINUTING DEVICE

Filed Jan. 19, 1959

INVENTOR.
CHARLES PAVIA
BY
Albert J. Kramer
ATTORNEY

Nov. 14, 1961    C. PAVIA    3,008,505
COMMINUTING DEVICE
Filed Jan. 19, 1959    4 Sheets-Sheet 2

INVENTOR.
CHARLES PAVIA
BY
*Albert J. Kramer*
ATTORNEY

Nov. 14, 1961 C. PAVIA 3,008,505
COMMINUTING DEVICE
Filed Jan. 19, 1959 4 Sheets-Sheet 3

INVENTOR.
CHARLES PAVIA
BY
Albert J. Kramer

Nov. 14, 1961 C. PAVIA 3,008,505
COMMINUTING DEVICE
Filed Jan. 19, 1959 4 Sheets-Sheet 4

INVENTOR.
CHARLES PAVIA
BY
*Albert J. Kramer*
ATTORNEY

United States Patent Office 3,008,505
Patented Nov. 14, 1961

3,008,505
COMMINUTING DEVICE
Charles Pavia, R.F.D. 1, Box 244A, Luray, Va.
Filed Jan. 19, 1959, Ser. No. 787,437
7 Claims. (Cl. 146—184)

This invention relates to comminuting devices and it is more particularly concerned with comminutors for reducing to small particle size various materials, such as meats, vegetables, fruits, and other products.

One of the objects of the invention is the provision of such a device which is particularly effective in comminuting fibrous materials, such as raw meat.

In various types of meat comminutors, a difficulty sometimes obtains due to the fact that the fibrous parts of the meat, during the comminuting action, separate and then recombine to form elongated stringy pieces that frequently escape the action of the comminutor by lying in a groove or other place where the comminuting action may not be effective and where it is difficult to dislodge the pieces in order to subject them to the cutting members of the comminutor.

Accordingly, a specific object of the invention is to provide a comminutor which is effective against such stringy pieces, to dislodge them after they are formed, and to subject them to the cutting action of the comminutor.

The present invention relates to my copending application for Patent Ser. No. 726,532, filed April 4, 1958, now Patent No. 2,941,561, and it comprises various improvements thereover hereinafter described and illustrated in the accompanying drawing.

In the drawing:

FIG. 10 is a side view of the extrusion cutter, apart from the device as a whole.

FIG. 11 is a sectional view along the line 11—11 of FIG. 10.

Figure 1:
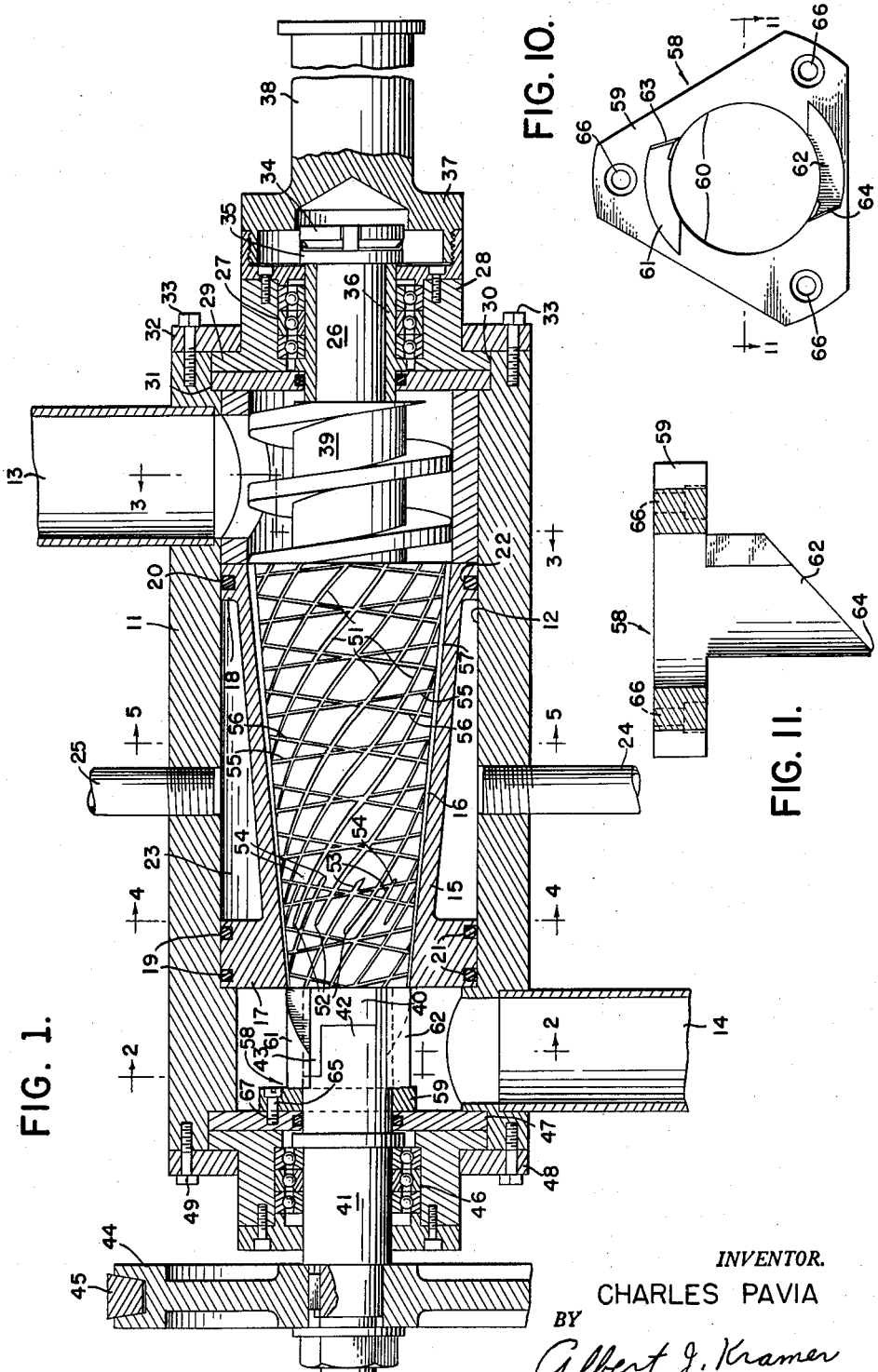
FIG. 1 is a longitudinal cross-sectional view of an embodiment of the invention.
Figure 2:
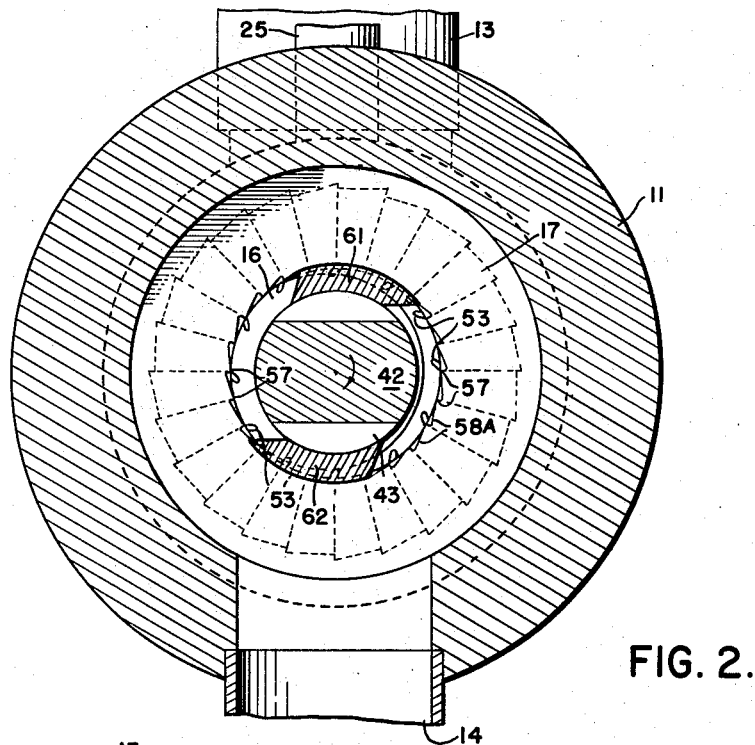
FIG. 2 is a section along the line 2—2 of FIG. 1.
Figure 3:
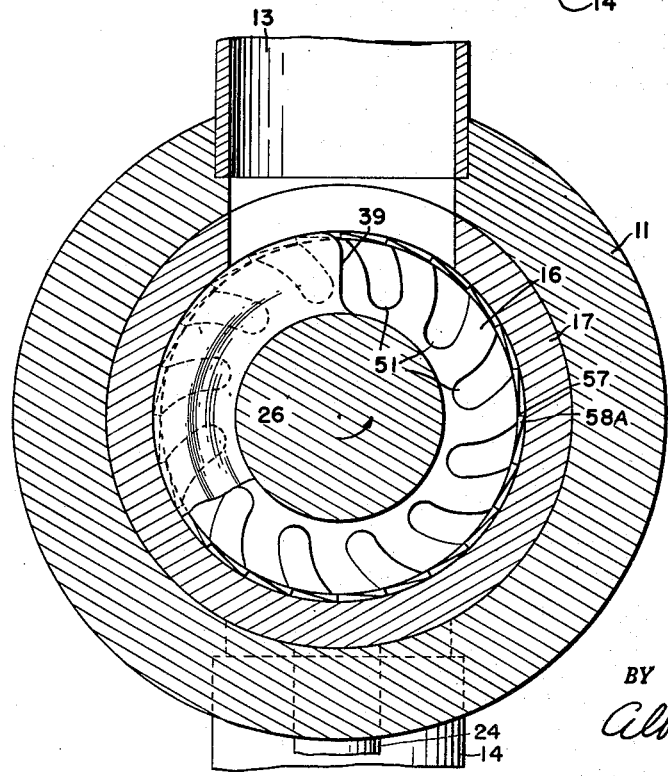
FIG. 3 is a section along the line 3—3 of FIG. 1 with parts broken away.
Figure 4:
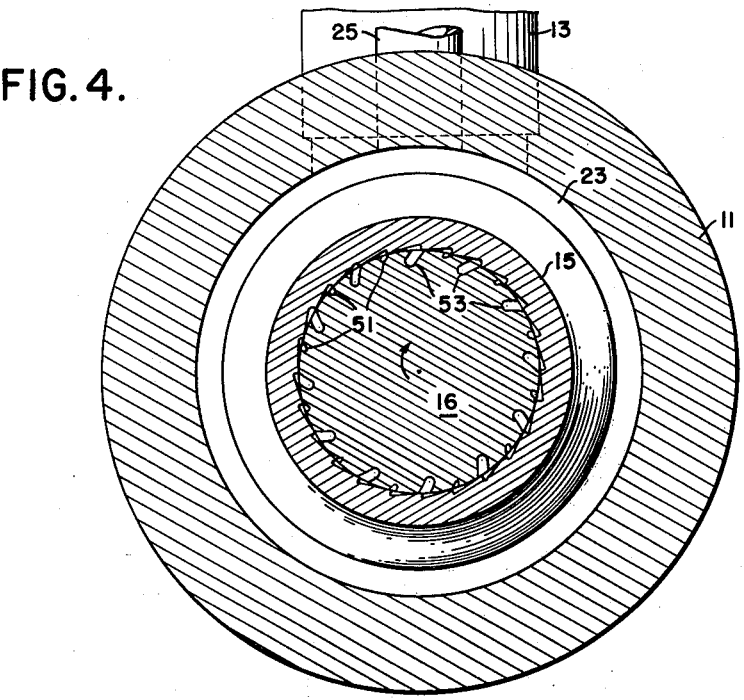
FIG. 4 is a section along the line 4—4 of FIG. 1.
Figure 5:
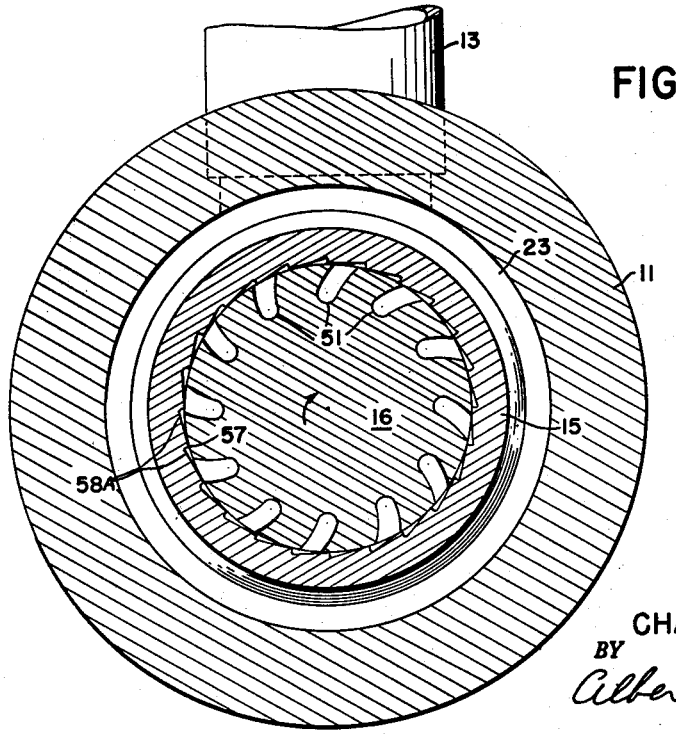
FIG. 5 is a section along the line 5—5 of FIG. 1.
Figure 6:
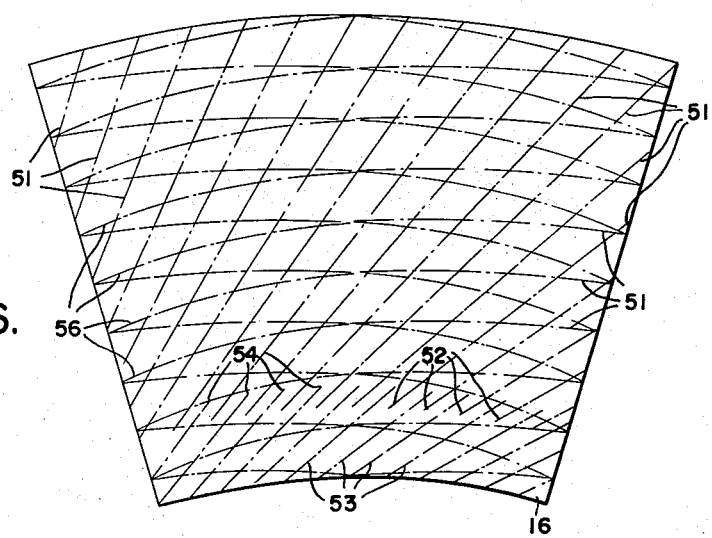
FIG. 6 is a developed view of the surface of the rotor showing the relative position of the grooves by their center lines.
Figure 9:
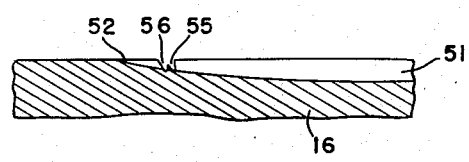
FIG. 9 is a section of a part of the rotor along the line 9—9 of FIG. 7.

Referring with more particularity to the drawing in which like numerals designate like parts throughout the various figures, the embodiment illustrated comprises a housing or casing 11 having a cylindrical bore 12 provided with an inlet 13 at one end for the introduction of material to be comminuted and an outlet 14 at the other end for the comminuted material.

Between said inlet and outlet there are disposed within the bore a stator 15 and a cooperating rotor 16.

The stator 15 is a frusto-conical shell having its narrower end nearer the outlet 14 and its larger end nearer the inlet 13. Flanges 17 and 18 at the ends of the shell set against the wall of the bore 12 with sealing rings 19 and 20 therebetween held in grooves 21 and 22, respectively. The annular space 23 between the flanges constitutes a jacket for a heat exchange fluid, such as steam, hot water, cold water, or any other heat exchange medium. Inlet and outlet pipes 24 and 25 are provided for the jacket.

The rotor 16 is tapered to fit the stator and it is provided with a special configuration of grooves, hereinafter more fully described. These grooves and the cutting edges formed thereby, cooperate with grooves and ridges of the stator, hereinafter also more fully described.

The rotor 16 is integral with a shaft 26 projecting from its larger end. The end of the shaft 26 is rotatably mounted in a bearing assembly 27 with a hollow end piece 28.

The end piece 28 is removably mounted on the housing by means of a flange 29 disposed in an annular recess 30 of the housing together with a seal or baffle 31 and a clamping ring 32 provided with lug bolts 33 to removably hold the baffle and flange in the recess, substantially as shown.

The shaft is held in proper relation to the bearing assembly by means of an end bolt 34 threadedly engaged with the shaft holding washer 35 against the end of the bushing 36.

An end cap 37 is threadedly engaged with the end piece 28 and it is provided with an elongated portion 38 which functions as a handle as may be needed for purposes of assembly and disassembly.

The portion of the shaft 26 between the stator 15 and the seal 31 is provided with a feed screw 39 which receives material from the inlet 13 and forces it against the end of the comminuting unit.

The opposite end of the rotor is integral with a stub shaft 40 which terminates in the space between the stator and the adjacent end of the housing. The stub shaft 40 is removably coupled to one end of a shaft 41, such as by the provision of complementary bifurcated ends 42 and 43 respectively. The opposite end of the shaft 41 is provided with a pulley 44 and is adapted to be rotated by a belt 45 driven by a motor (not shown).

The shaft 41 is rotatably supported on a bearing assembly 46 which is clamped to the end of the housing 11 together with a seal or baffle plate 47 by means of a clamping ring 48 held by lugs or clamping bolts 49.

The grooves of the rotor 16 comprise a first set 51 which are generally disposed in the longitudinal direction and extend in a twist from the larger end of the rotor each to a point 52 short of the smaller end of the rotor, substantially as illustrated. These grooves are also progressively shallow from the larger end to the points 52. At said point 52 the grooves cease to have any depth so that any material passing through them to this point is compelled to come to the surface of the rotor.

Figure 8:
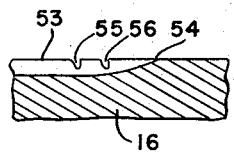
FIG. 8 is a section of a part of the rotor along the line 8—8 of FIG. 7.
Figure 7:
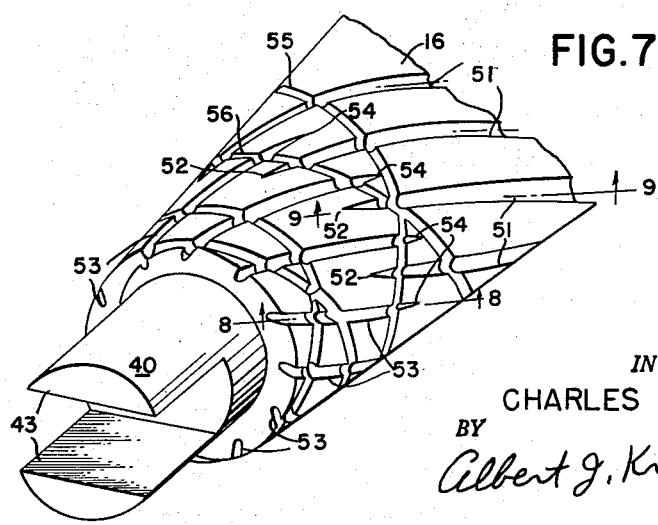
FIG. 7 is an enlarged fragmentary perspective view of a portion of the rotor at its smaller diameter end.

A set of shorter longitudinal grooves 53 extend from the smaller end of the rotor between the grooves 51 and terminate at point 54 beyond the points 52 so that the inner end portions of the grooves 51 and 53 are in overlapping relation, as shown. The grooves 53 may also be tapered, as shown in FIG. 8, although this is not absolutely essential.

In addition to the longitudinal grooves 51 and 53, there are also provided transverse grooves 55 and 56 of substantially constant depth. These transverse grooves encircle the rotor a plurality of times, one advancing in one direction and the other advancing in the opposite direction, as in the case of reverse threads of a lead screw actually intersect each other at a number of points as well as intersecting the longitudinal grooves 51 and 53.

As a result of these grooves, there is provided first of all a multiplicity of cutting edges which cooperate with the ridges of the stator 15 to perform the primary cutting action. In the case of fibrous materials, like raw meat, the fibers may collect along the grooves and become grouped in stringy lengths which, unless severed, result in clogging, reduced throughput, and an unsatisfactory end product. By decreasing the depth of the grooves 51 in the direction from the larger end of the rotor, these fibrous strings are gradually brought to the surface of the stator where the cutting edges of the ridges of the stator are located. When they reach the end of these grooves 51, they can no longer proceed farther without passing from these grooves to the grooves 53. This requires that the material first pass into the spaces between the ridges of the stator before re-entering the grooves 53. In the course of this movement, the fibers are subjected to the positive cutting action of the cutting edges between the rotor and stator.

The ridges of the stator 15 are so designed as to provide a sharp incident cutting edge 57 to material carried in the rotor grooves, the space 58A between these edges being of triangular cross-section, as shown.

The cutting action of the comminutor is rendered more efficient by forming the grooves 51 and 53 in non-radial positions, the displacement from the radial being in the direction of rotation of the rotor, substantially as shown.

An additional cutting action may be provided by the extrusion cutter 58 disposed about the ends of the shafts 40 and 41 between the flange 17 and plate 47. Said cutter 58 comprises a flat plate 59 having a circular aperture 60 for the reception of the shaft 41. The plate 59 carries diametrically opposed cutting members projecting as fingers 61 and 62, respectively. Each of these cutting members are partially cylindrical to lie along a portion of the periphery of the shaft 40. The cutting members 61, 62 each extend longitudinally toward the rotor 16 and is tapered as clearly shown in FIG. 11 from a forward cutting edge 63, 64 respectively, which lies adjacent the smaller end of the rotor and is thus effective to sever material as it exudes from the grooves 53 during rotation of the rotor.

The member 58 is secured in place against rotation by means of stud bolts or lugs 65 passing through aperture 66 in the plate 59 to engage threaded apertures 67 in the plate 47.

Having thus described my invention, I claim:

1. In a comminutor having a frusto-conical stator with cutting edges and a cooperating frusto-conical rotor, said rotor having a first group of longitudinal grooves extending from the larger end toward the smaller end and terminating at points between the ends of the rotor, said grooves being progressively shallower as they extend farther and farther from the larger end of the rotor, said rotor also having a second group of longitudinal grooves extending from the smaller end toward the larger end, and terminating at points between consecutive grooves of the first group.

2. A comminutor as defined by claim 1 in which the longitudinal grooves of the rotor each extend in a twist from the larger end of the rotor.

3. A comminutor as defined by claim 1 in which the rotor also has a transverse groove encircling it and intersecting the longitudinal grooves.

4. A comminutor as defined by claim 1 in which the rotor also has a pair of transverse spiral grooves encircling it in opposite directions, said spiral grooves intersecting each other and also intersecting said longitudinal grooves a multiplicity of times.

5. A comminutor as defined by claim 1 in which the longitudinal grooves of the rotor are non-radial.

6. A comminutor as defined by claim 5 in which the grooves are displaced from the radial in the direction of rotation of the rotor.

7. A comminutor comprising a longitudinally grooved frusto-conical stator and a cooperating rotor, a housing for said stator and rotor, one portion of said rotor comprising a feed screw, and another portion of said rotor having a frusto-conical shape complementary to said stator, said rotor having a first group of longitudinal grooves extending from its larger end toward its smaller end and each terminating at an inner point between the ends of the rotor, said grooves being each progressively shallower as they extend towards the terminal inner point, said rotor also having a second group of longitudinal grooves extending from the smaller end of the rotor toward the larger end and terminating each at a point between a consecutive pair of grooves of the first group.

References Cited in the file of this patent

UNITED STATES PATENTS

| | | |
|---|---|---|
| 2,133,756 | Rodgers | Oct. 18, 1938 |
| 2,210,006 | Rieske | Aug. 6, 1940 |

FOREIGN PATENTS

| | | |
|---|---|---|
| 443,481 | Great Britain | Feb. 28, 1936 |